2,884,332

PRINTING OF TEXTILE MATERIALS AND PREPARATIONS THEREFOR

Arthur Locher, Binningen, near Basel, and Arnold Dürst, Basel, Switzerland, assignors, by mesne asignments, to Saul & Co., Newark, N.J., as nominee of Fidelity Union Trust Company, executive trustee under Sandoz Trust No Drawing. Application April 29, 1954
Serial No. 426,549

Claims priority, application Switzerland April 30, 1953

8 Claims. (Cl. 106—22)

The present invention relates to the printing of textile materials and to the corresponding printing preparations.

In accordance with the invention, the printing of the textile materials or textile articles is effected with the aid of aqueous viscose solutions which contain organic pigment dyestuffs which are stable to the aqueous viscose solutions and to the aftertreatment baths which may be employed. By "printing" is meant printing proper with printing rollers and screens, etc., as well as pad-printing. The viscose solutions are advantageously prepared from ripened or partially ripened viscose with a content of 6 to 10% by weight of α-cellulose or from stabilized cellulose xanthate containing a maximum of one mol of alkali metal ion per mol of carbon disulfide. The solutions advantageously contain from about 1 to about 8% by weight of α-cellulose, and preferably have a pH value of about 10 to 12. In addition to the organic pigments, which are preferably present in most finely subdivided form in order to yield strong and vivid prints, the viscose solutions may also contain wetting agents or dispersing agents.

The water-soluble cellulose compounds required for the purposes of the present invention are prepared in conventional manner, for example by the treatment of cellulose with sodium hydroxide and carbon disulfide. A cellulose xanthate prepared in this manner dissolves readily in dilute aqueous caustic soda to yield viscose. The latter contains about 6 to 10% by weight of α-cellulose and substantially the same or a slightly smaller amount of sodium hydroxide. The viscose is preferably used in the ripened or partly ripened state. It has only a limited stability which, however, can be increased by the addition of alkali, it being well known that the viscose ripening process is retarded in the presence of excess alkali.

Particularly valuable for the purposes of the present invention are aqueous solutions of alkali cellulose xanthates, e.g. sodium cellulose xanthate, which contain at most the precise amount of alkali metal ion necessary for the xanthate formation, that is one mol of alkali metal ion per mol of carbon disulfide. In the dry state, such xanthate is stable for a period of months and is therefore frequently designated "stabilized" cellulose xanthate. The said designation is used in this sense in the instant specification. The stabilized cellulose xanthate may be prepared for example according to the Fabelta Belgian Patent No. 525,681 of January 13, 1954, accepted January 30, 1954. Such stabilized cellulose xanthate is prepared as follows:

100 parts of alkali cellulose, obtained from sulfite cellulose, said alkali cellulose containing 30% of α-cellulose and 15% of sodium hydroxide, are converted, by treatment with 20 parts of carbon disulfide, into the xanthate. From the latter, there is made a viscose which contains 7% of α-cellulose and 7% of sodium hydroxide. The dissolved cellulose possess a polymerization degree of 450, the degree of xanthogenation being 0.9. The viscose is spun at −5° C. in a coagulation bath made of methanol. Then the sodium cellulose xanthate coagulated in fiber form is washed with ethyl ether, is dried at 60° C. in a current of hot air and is finally dehydrated in vacuo over a drying medium such as phosphorus pentoxide. The thus-obtained sodium cellulose xanthate possesses, when kept in vacuo, after one year a xanthogenation degree of still 0.45 and dissolves completely in water to form a colloidal solution.

Illustrative of wetting agents or dispersing agents which the viscose solutions of the present invention may contain are inter alia soap, tetraline, cyclohexanone, dioctyl phthalate, ethylene glycol, thio-diethylene glycol, alkyl polyglycol ethers with 20 to 25 ethenoxy groups as for instance cetyl polyglycol ether, stearyl polyglycol ether and oleyl polyglycol ether, alkylarylsulfonates such as alkylbenzenesulfonates and alkylnaphthalenesulfonates, fatty acid condensation products, sulfonated fatty acid esters, oleic acid monoglycerol ester and its sulfonated derivatives, high molecular alkyl sulfates and sulfonates, alkali-resistant carob bean flour, and many others. Aromatic solvents, such as toluene and solvent naphtha, may also be employed in emulsified state for example with the aid of an alkylaryl polyglycol ether.

The action of such additaments is to increase the color strength of the prints and/or to reduce the viscosity of the solutions. Some of them enhance the solubilization of the stabilized cellulose xanthate, this being the case with for example the alkyl and alkylaryl polyglycol ethers. A similar action on the stabilized cellulose xanthate is exerted by alkalies, for example caustic soda. By appropriate combination of wetting agents or dispersing agents, it is possible to enhance the color strength of the prints and also to adjust the printing pastes to the desired viscosity. One such combination is, for example, a mixture of dioctyl phthalate and caustic soda.

In accordance with the present invention, the organic pigment dyestuffs can be admixed with stabilized cellulose xanthate to yield finished preparations. These preparations may also contain wetting agents or dispersing agents; it is preferred that these additaments be solid substances. The preparations are of a satisfactory stability; just prior to use, they are stirred into water to form colloidal solutions. Mixtures of pigment dyestuffs or stabilized cellulose xanthate with wetting agents or dispersing agents alone are also useful in connection with the present invention. The ease of working with preparations of this type is enhanced in accordance with the intimateness with which the constituents thereof are intermixed.

Textile materials which can be printed in accordance with the present invention comprise those of natural origin, such for example as fibers and fabrics of cotton, jute, hemp, flax, wool and silk, and also artificial fibers and fabrics, such for example as those of regenerated cellulose and of wholly synthetic fibrous materials. Illustrative of the latter are inter alia polyamide fibers, polyester fibers, polyvinyl chloride fibers, polyacrylonitrile fibers, polystyrene fibers, mixed polymers on the basis of vinyl chloride, mixed polymers on the basis of acrylonitrile, etc. The invention is also excellently adapted for the printing of mixed fabrics from the aforementioned fibers, such as the mixed fabrics which are frequently being sold on the market; as is known, this type of mixed fabric has heretofore presented considerable difficulty in finishing by means of dyeing and printing processes. Very good prints are also obtained, according to the present invention, on fabrics made of glass fibers.

A wide variety of organic pigment dyestuffs can be employed in carrying out the invention. Examples of such organic pigment dyestuffs are carbon black (e.g. gas black), azo dyestuffs (e.g. ice colors), lake dyestuffs (e.g. light and heavy metal lakes or precipitates with complex heavy metal salts), etc., in so far as they comply with the previously indicated requirements, namely, stability to cellulose xanthate and to aftertreatment baths. In order to satisfy highest fastness requirements, pigment dyestuffs of the anthraquinone, benzanthrone and phthalocyanine series are preferred.

The present invention makes it possible, by appropriate selection of pigment dyestuffs, to prepare prints which are equally as good as those obtained with vat dyes in almost every respect, as for example as regards fastness to light, to chlorine and to washing. Where maximum fastness is not required, simpler and cheaper pigment dyestuffs may be employed.

In accordance with the invention, aqueous printing pastes are employed which, per kilogram of paste, contain up to 50 grams of pigment dyestuff or pigment dyestuffs mixture (preferably in finest subdivision) and 10 to 80 grams of sodium cellulose xanthate, and which may contain 20 to 150 grams of wetting agent and/or dispersing agent. The quantity of pigment dyestuff may be increased; this is particularly desirable in the preparation of black prints. The constituents of the pastes may be admixed individually or in the form of mixtures of any desired composition of the type hereinbefore described. The finely subdivided pigment dyestuffs are most easily handled in the form of aqueous pastes.

The prints may be applied in desired manner and may be worked up in various ways. Valuable results are obtained if, for example, after a so-called intermediate drying at about 40–60° C., they are developed by treatment in precipitating and other aftertreatment baths and then dried.

The composition of the precipitating baths may vary within wide limits. Thus, use may advantageously be made of an aqueous bath which contains, per 1000 parts by weight of bath, 200 to 300 parts by weight of Glauber's salt, 10 to 20 parts by weight of crystalline zinc sulfate, and 100 to 150 parts by weight of concentrated sulfuric acid. Sulfuric acid of 10 to 20% strength is also alone sufficient for decomposition of the cellulose xanthate. The treatment in the precipitating bath lasts from 2 to 20 minutes and is preferably carried out at temperatures up to 40° C.; conclusion of the treatment can be recognized by the fact that a cloudy print is replaced, in the printing process, by a clear print.

After washing the thus-treated print with cold water, it is aftertreated in an aqueous bath which contains 3 to 6 parts by weight of sodium carbonate and 1.5 to 3 parts by weight of sodium bicarbonate, and if desired also 1.5 to 3 parts by weight of sodium thiosulfate, per 1000 parts by weight of bath. This treatment also lasts 2 to 20 minutes, is carried out at about 80 to 90° C., and is followed by further thorough rinsing of the print. Finally, the latter is dried. Fibers which are sensitive to treatment with alkali, as for example wool, may be treated in a bath wherein the sodium salts are replaced by an organic amine, such as triethanolamine, in an amount of 3 to 6 parts by weight per 1000 parts by weight of bath.

Excellent results are also obtained when the prints, preferably dried, are not developed by treatment in aftertreatment baths, but rather by steaming, followed by rinsing with water. The steaming procedure requires only a short time, for example 3 to 8 minutes. It is carried out at elevated temperature, preferably at 100–105° C. The steamed and rinsed material is then advantageously soaped in conventional manner at elevated temperature, preferably at 80–100° C. For this purpose, aqueous soap solutions with a content of 3 to 5 grams of Marseilles soap per liter of solution are excellently suitable.

Finally, it is also possible to subject the prints prepared according to the present invention, if desired after an intermediate drying at 40–60° C., to temperatures of about 100° C. and over, preferably of 120–130° C., and then to rinse them with water. This fixing process takes about 5 to 10 minutes at temperatures of 120–130° C. The dried products have a cloudy appearance. The water-insoluble decomposition products of the cellulose xanthate are dissolved out by rinsing in cold water; in this way, the original pure shades of the prints are restored.

The following examples set forth presently-preferred illustrative embodiments of the invention; these are intended to be exemplary and not at all restrictive in character. In these examples, the parts are by weight, the percentages are by weight, and the temperatures are in degrees centigrade.

*Example 1*

A printing paste of (a) 100 parts of a 20% dough of the azo pigment dyestuff obtained by coupling diazotized 1-amino-2-methyl-4-chlorobenzene with 2-hydroxynaphthalene-3-carboxylic acid phenylamide, and (b) 900 parts of a 1.5% aqueous solution of sodium cellulose xanthate having a pH of 10.1, is printed onto cotton fabric. The print is dried at 40–60°, treated for 2 minutes in a cold aqueous bath containing 125 grams of concentrated sulfuric acid per liter, and then rinsed with cold water. The print is then digested for a half hour at 90° in an aqueous bath which contains 6 grams of sodium carbonate and 1.5 grams of sodium bicarbonate per liter, again thoroughly washed with water, and finally dried. A red print is obtained which is characterized by very good fastness to water and good fastness to washing (100°).

*Example 2*

33 parts of stabilized sodium cellulose xanthate and 50 parts of a sulfonated fatty acid ester are dissolved in 437 parts of 4% aqueous sodium hydroxide solution. To the resultant solution, the pH of which is 12, there are added 400 parts of water and 80 parts of a 20% aqueous paste of 1-(Bz-1'-benzanthronyl)-aminoanthraquinone.

The so-obtained printing paste is printed onto a fabric of synthetic polyamide fibers (nylon). The print is dried at 50° and then treated for 5 minutes at 30° in an aqueous bath which contains, per liter, 250 grams of anhydrous sodium sulfate, 15 parts of crystalline zinc sulfate and 125 parts of concentrated sulfuric acid.

The print is rinsed with cold water, then moved about for 30 minutes at 90° in an aqueous bath containing 3 grams of sodium thiosulfate, 3 grams of sodium carbonate and 1.5 grams of sodium bicarbonate per liter, after which it is dried. A violet-tinged red-brown print is obtained which is characterized by outstanding fastness properties, especially by excellent fastness to light and to chlorine and superior fastness to washing (100°).

*Example 3*

A printing paste consisting of (a) 90 parts of a printing preparation made of 15 parts of hexadecachloro-copper-phthalocyanine, 25 parts of stabilized sodium cellulose xanthate and 50 parts of sodium dinaphthylmethane disulfonate, (b) 880 parts of water, and (c) 30 parts of aqueous caustic soda solution (38° Bé.), is printed onto a staple rayon fabric, the print dried at 60° and then treated for 4 minutes at 40° in an aqueous bath containing 175 grams of concentrated sulfuric acid per liter. The print is then rinsed with cold water, after which it is digested for a half hour at 90° in an aqueous bath which contains 3 grams of sodium carbonate and 3 grams of sodium bicarbonate per liter, again rinsed with water, and finally dried. A green print is obtained which satisfies the highest fastness requirements.

Example 4

50 parts of a 20% aqueous paste of 5-(anthraquinonyl-1')-amino-1,9-isothiazolanthrone, 100 parts of water, and 850 parts of an emulsion (pH=12.05) consisting of 750 parts of viscose 8% and 100 parts of dioctyl phthalate, are stirred together to form a printing paste.

The thus-prepared paste is printed onto a viscose fabric, the print dried at 45° and then treated for 5 minutes in a cold aqueous bath which contains, per liter, 200 grams of anhydrous sodium sulfate, 20 grams of crystalline zinc sulfate and 100 grams of concentrated sulfuric acid. The print is thereupon rinsed with cold water and then moved about for 30 minutes at 80° in an aqueous bath containing, per liter, 2 grams of sodium thiosulfate, 3 grams of sodium carbonate and 3 grams of sodium bicarbonate. Finally, the obtained brownish red print is thoroughly rinsed with water and dried. It is excellently fast to light, to rubbing and to water, and has a very good fastness to washing (60°).

Example 5

A printing paste consisting of (a) 30 parts of an intimately ground equimolecular mixture of copper phthalocyanine and hexadecachloro-copper-phthalocyanine, (b) 410 parts of water, and (c) 560 parts of a solution of 25 parts of stabilized sodium cellulose xanthate and 20 parts of sodium hydroxide in 515 parts of water, is printed onto a Dacron fabric, after which the print is aftertreated after the manner set forth in Example 4. The resultant blue-green print possesses excellent fastness properties.

Example 6

A printing paste consisting of (a) 15 parts of finely dispersed dibromindanthrene, (b) 185 parts of water, and (c) 800 parts of a solution of 23 parts of sodium cellulose xanthate, 67 parts of a 30% aqueous solution of a cetyl polyglycol ether and 40 parts of aqueous caustic soda solution (38° Bé.) in 670 parts of water, is printed onto a wool fabric. The print is dried at 40° and then treated for 5 minutes in a cold aqueous bath which contains, per liter, 200 grams of anhydrous sodium sulfate, 10 grams of crystalline zinc sulfate and 100 grams of concentrated sulfuric acid. Next, the print is thoroughly rinsed with cold water, and then moved about for 30 minutes at 70° in an aqueous bath containing, per liter, 4 grams of triethanolamine, after which the print is dried. The obtained blue print has an outstanding fastness to light and a very good fastness to washing (60°).

Example 7

An artificial silk fabric is printed with a paste of (a) 200 parts of a 20% aqueous paste of gas black, (b) 350 parts of water, and (c) 450 parts of an emulsion of 400 parts of viscose 9% and 50 parts of castor oil, which emulsion has a pH of 12. The print, after first being dried, is treated for 3 minutes in a precipitating bath and then for 2 minutes in a second bath, as described in Example 6. There is obtained a grayish black print which is fast to water.

Example 8

A printing paste of (a) 100 parts of a 20% aqueous paste of calcium-aluminum lake of 1,2-dihydroxyanthraquinone, (b) 200 parts of water, and (c) 700 parts of a solution prepared from 21 parts of stabilized sodium cellulose xanthate, 569 parts of water, 50 parts of white spirit ("Schwerbenzin") and 60 parts of aqueous sodium hydroxide solution (38° Bé.), is printed onto a mixed fabric of cotton and viscose rayon. The print is worked up after the manner described in Example 4, and there is obtained a bluish red print which is fast to water and to washing.

Example 9

A printing preparation is prepared from 30 parts of the azo pigment dyestuff obtainable by coupling diazotized 1-amino-2-nitro-4-methylbenzene with acetoacetylaminobenzene, and 45 parts of sodium dinaphthylmethane disulfonate. 25 parts of this preparation are stirred into 887 parts of water, 5 parts of a dodecylphenyl polyglycol ether, 33 parts of stabilized sodium cellulose xanthate and 50 parts of aqueous caustic soda solution (38° Bé.) to form a printing paste, which is then printed onto a fabric of Acrilan fibers. The print is dried at 40–60°, treated for 6 minutes at 100° in a steam chest, then thoroughly washed in cold water, and thereupon soaped at 80° in a soap bath containing 5 grams of Marseilles soap per liter. After drying the thus-treated material, a yellow print is obtained which has a very good fastness to water and a good fastness to washing (60°).

Example 10

A printing paste of (a) 50 parts of a 20% aqueous paste of N-monobenzoyl-1,4-diamino-2-methoxyanthraquinone, (b) 200 parts of water, and (c) 750 parts of viscose 10%, is printed onto a glass fiber fabric. The obtained print is dried at 45°, steamed for 4 minutes at 105°, then rinsed with cold water and finally soaped at 100° in a soap solution which contains 3 grams of soap per liter. The dried red-violet print is characterized by excellent fastness to light and good fastness to water.

Example 11

A mixture of (a) 100 parts of a 20% aqueous paste of carbazolized 1-(Bz-1'-benzanthronyl)-amino-6,7-dichloroanthraquinone, (b) 765 parts of water, (c) 60 parts of aqueous caustic soda solution (38° Bé.), and (d) 75 parts of a preparation consisting of 25 parts of stabilized sodium cellulose xanthate and 50 parts of sodium benzylsulfanilate, is padded onto a Perlon fabric. The dyeing is dried at 40–60°, treated for 6 minutes at 100° in a steam chest, thoroughly washed in cold water, and then soaped at 80° in a soap bath which contains 5 grams of Marseilles soap per liter. After drying, there is obtained a level red-brown dyeing which has good fastness to light, to rubbing, to washing and to water.

Example 12

A printing paste of (a) 80 parts of a 20% aqueous paste of 1-(Bz-1'-benzanthronyl)-aminoanthraquinone, (b) 220 parts of water, and (c) 700 parts of viscose 9%, is printed onto a Dynel fabric. The print is preliminarily dried at 40° and is then heated to 120° in a drying chest. After being thus dried, the print has a cloudy violet-brown shade which, by rinsing with cold water, is converted into a clear violet-tinged red-brown. The print is fast to light, to rubbing, to washing and to water.

Example 13

50 parts of hexadecachloro-copper-phthalocyanine and 50 parts of copper phthalocyanine are intimately admixed with 50 parts of stabilized sodium cellulose xanthate and 100 parts of sodium dinaphthylmethane disulfonate.

25 parts of the thus-obtained printing preparation are stirred together with 975 parts of a viscose solution prepared from 20 parts of stabilized sodium cellulose xanthate, 30 parts of aqueous caustic soda (38° Bé.), and 925 parts of water to form a printing paste, which is then padded onto a cotton fabric. The dyeing is first subjected to a preliminary drying at 60°. Then it is dried at 130° to completely water-free state. It now has a cloudy green-blue shade. By thoroughly rinsing with cold water, the original pure blue shade is restored. The dyeing is fast to light, to rubbing, to washing and to water.

Having thus disclosed the invention, what is claimed is:
1. The method of printing on textile material, which comprises applying thereto a printing paste made from aqueous viscose solution, organic pigment dyestuff which is stable to cellulose xanthate, and wetting agent.

2. The method of printing on textile material, which comprises applying thereto a printing paste made from aqueous viscose solution and organic pigment dyestuff which is stable to cellulose xanthate.

3. The method of printing on textile material according to claim 2, wherein the aqueous viscose solution contains 1 to 8% by weight of α-cellulose and has a pH of 10 to 12.

4. The method of printing on textile material according to claim 3, wherein the aqueous viscose solution is prepared by dissolving partially ripened to ripened viscose containing 6 to 10% by weight of α-cellulose, in water.

5. The method of printing on textile material according to claim 3, wherein the aqueous viscose solution is prepared by dissolving stabilized cellulose xanthate containing not more than 1 mol of alkali metal ion per mol of carbon disulfide, in water, said xanthate being free from extraneous added stabilizer.

6. As a composition of matter, a solid printing preparation for printing on textile material, said preparation comprising an intimate admixture of (a) stabilized cellulose xanthate which is stable against decomposition on storage and retains its capacity of dissolving in water with formation of a colloidal solution, said stabilized cellulose xanthate containing not more than 1 mol of alkali metal ion per mol of carbon disulfide and being free from extraneous added stabilizer, (b) organic pigment dyestuff which is stable to cellulose xanthate, and (c) wetting agent, whereby the printing preparation may be used for textile printing in the form of an aqueous printing paste.

7. As a composition of matter, a solid printing preparation for printing on textile material, said preparation comprising an intimate admixture of (a) stabilized cellulose xanthate which is stable against decomposition on storage and retains its capacity of dissolving in water with formation of a colloidal solution, and which is free from extraneous added stabilizer, and (b) organic pigment dyestuff which is stable to cellulose xanthate, whereby the printing preparation may be used for textile printing in the form of an aqueous printing paste.

8. As a composition of matter, a solid printing preparation for printing on textile material, said preparation comprising an intimate admixture of (a) stabilized cellulose xanthate which is stable against decomposition on storage and retains its capacity of dissolving in water with formation of a colloidal solution, and which is free from extraneous added stabilizer, and (b) wetting agent, whereby the printing preparation may be used for textile printing in the form of an aqueous printing paste.

References Cited in the file of this patent

UNITED STATES PATENTS

| | | |
|---|---|---|
| 1,379,351 | Lillienfeld | May 24, 1921 |
| 1,915,228 | Hegan | June 20, 1933 |
| 1,922,952 | Hegan et al. | Aug. 15, 1933 |
| 1,951,119 | Alt et al. | Mar. 13, 1934 |
| 2,145,580 | Bley | Jan. 31, 1939 |
| 2,234,031 | Wenning et al. | Mar. 4, 1941 |
| 2,432,085 | Bley | Dec. 9, 1947 |
| 2,644,814 | Fischer | July 7, 1953 |
| 2,658,888 | Fischer | Nov. 10, 1953 |

FOREIGN PATENTS

| | | |
|---|---|---|
| 21,030 | Great Britain | of 1903 |
| 357,808 | Great Britain | Oct. 1, 1931 |
| 426,099 | Great Britain | Mar. 27, 1935 |
| 525,681 | Belgium | Jan. 30, 1954 |